Oct. 7, 1930.  H. COLE  1,777,784
CLOTHESLINE REEL
Filed Aug. 26, 1929
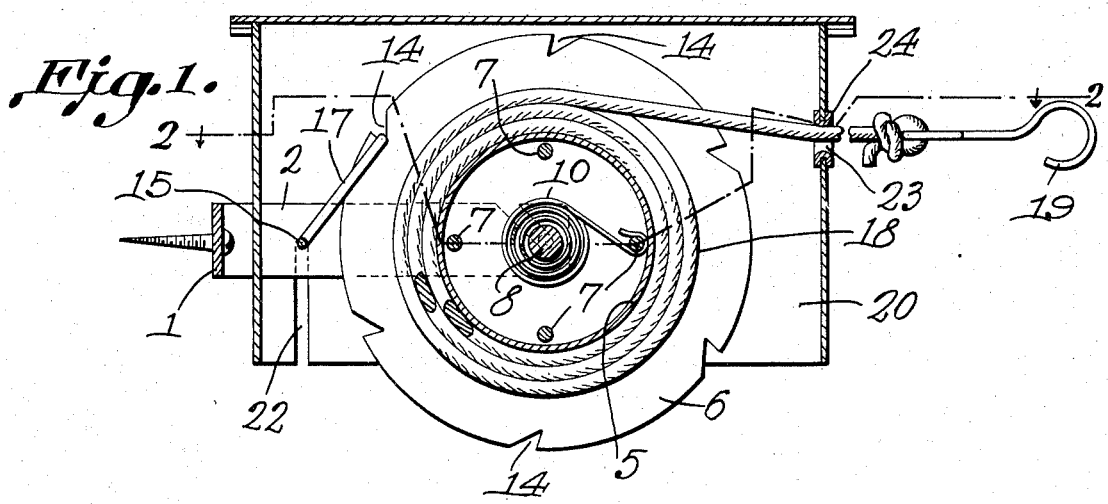
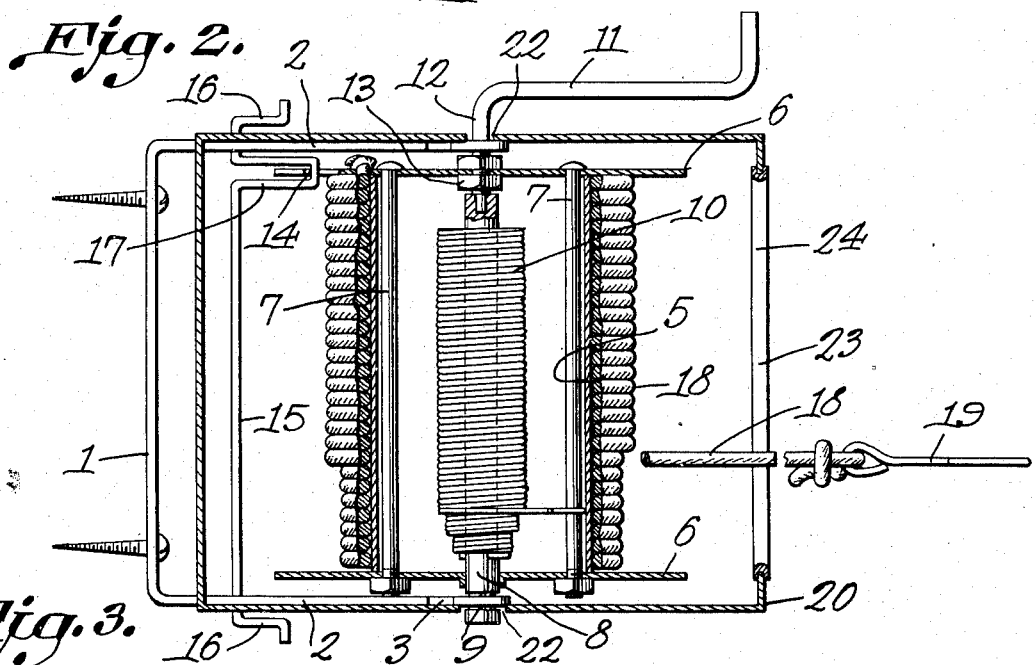
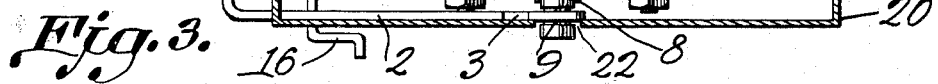
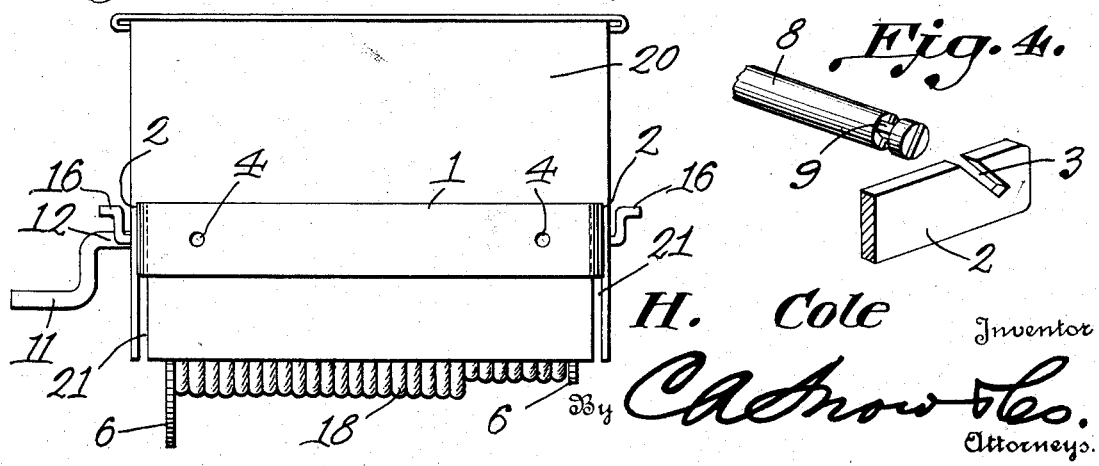
H. Cole Inventor Patented Oct. 7, 1930

1,777,784

UNITED STATES PATENT OFFICE

HARRY COLE, OF ANDOVER, OHIO, ASSIGNOR OF ONE-HALF TO ERNEST EJBL, OF ANDOVER, OHIO

CLOTHESLINE REEL

Application filed August 26, 1929. Serial No. 388,533.

This invention relates to a reel for clothes lines, one of the objects being to provide a spring controlled reel which will automatically take up slack in a clothes line but will allow any amount of the line to be paid out when it is desired to use the same.

Another object is to provide a means for use in connection with the reel whereby the line will be prevented from sagging to an undesirable extent after it has been set up for use.

A further object it to combine with the reel a simple and efficient housing which will protect the line while not in use.

A still further object is to provide a housing which can be removed readily whenever it is desired to obtain access to the reel or the coiled rope thereon.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

In said drawing,

Figure 1 is a vertical longitudinal section through the housing and across the reel therein.

Figure 2 is a section on line 2—2, Figure 1.

Figure 3 is a rear elevation of the device.

Figure 4 is a detail view of a portion of the supporting yoke and one end portion of the reel shaft adapted to engage the same.

Referring to the figures by characters of reference, 1 designates a yoke which can be formed of a flat strip of metal. The arms 2 of this yoke are parallel and each of them has an inclined slot 3 extending downwardly thereinto adjacent its free end. Openings 4 may be formed in the intermediate portion of the yoke for the reception of fastening screws or the like whereby the yoke can be fastened securely to a post or other supporting structure and held in a substantially horizontal position.

The reel forming a part of this invention includes a drum 5 which can be of sheet metal interposed between heads 6 in the form of disks. These parts are held assembled by tie bolts 7 that extend through the disks and drum and serve to hold the drum properly centered relative to the disks and also to bind the disks or heads against the drum.

The shaft 8 of the reel is adapted to be held against rotation, this shaft being formed with a reduced portion 9 near one end insertable into one of the slots 3. To the shaft is secured one end of a spring 10. This spring is coiled about the shaft and has its other end attached to the drum 5. Thus when the drum is rotated in one direction on the shaft 8 the spring 10 will be placed under increased tension and, when the drum is thereafter released, the spring will rotate it in the opposite direction.

One of the disks or heads 6 of the drum is rotatably mounted on shaft 8 while the other disk or head 6 has a crank arm 11 connected thereto by means of a stem 12 projecting through said head or disk 6 and journaled in the adjacent end of the shaft 8. Nuts 13 mounted on this stem 12 serve to bind on the interposed head or disk 6 so as to hold it securely to the stem 12.

Either or both of the heads or disks 6 may be formed with peripheral notches 14. In the present instance only one of these disks are so provided. A rod 15 is extended transversely of the yoke 1 and is journaled in the arm 2. This rod is provided at each end with a small crank arm 16 by means of which it can be rotated. At an intermediate point the rod has a finger 17 extending radially therefrom. If desired, this finger can be in the form of a small yoke adapted to be seated in one of the notches 14 and straddle a portion of the engaged head or disk 6 as shown for example in Figures 1 and 2.

A clothes line 18 is adapted to be secured at one end to the drum 5 and the free end of said line may be provided with a hook 19 or the like for engaging a supporting structure.

A box-like housing 20 open at the bottom is provided for protecting the reel and the line thereon. This housing has slots 21 in the back wall thereof spaced apart to receive the arms 2 of the yoke when the housing is moved downwardly relative to the yoke. The sides of the housing have slots 22 extending upwardly thereinto for the reception of the end portions of rod 15, the projecting end of shaft 8, and the stem 12. A horizontally extended slot 23 is formed in the front of the housing and the edges of these slots can be reinforced and rounded as shown at 24.

The line 18 is so wrapped around the drum that, when it is pulled outwardly through the slot 23, it will increase the tension of spring 10. This unwinding of the line cannot be effected, however, unless the dog 17 is first disengaged from the notched head or disk 6. After the line has been extended a desired distance and the free end thereof attached to a supporting structure, the tensioned spring will draw the line taut. By then swinging dog 17 into the adjacent notch 14 the line will be prevented from sagging when subjected to a load.

When it is desired to house the line the same is unfastened at its outer end and will be taken up automatically by the spring actuated reel.

Obviously by lifting the housing off of the yoke 1 and sliding it along the extended portion of the line, the reel will be fully exposed. Said reel can then be removed from the arms 2 simply by sliding shaft 8 and stem 12 out of the respective slots 3. By means of the crank 11 the tension of the spring can be regulated by rotating the drum relative to its shaft 8 before the line is wrapped therearound.

What is claimed is:

A device of the class described including a yoke, a reel, a spring within the reel, a shaft on which the reel is mounted for rotation, a stem rotatable with the reel and providing a bearing for one end of the shaft, said shaft and stem being detachably mounted in opposed portions of the yoke, the spring being attached at its ends to the shaft and reel respectively, and a line secured to and extending from the reel, said spring constituting means for automatically winding the line on the reel.

In testimony that I claim the foregoing as my own, I have hereto affixed my signature.

HARRY COLE.